E. W. APPELMAN.

LAND DRAIN.

APPLICATION FILED MAY 17, 1913.

Reissued July 15, 1913. 13,595.

Witnesses,
F. B. Mann
J. M. Lutz

Inventor:
Erastus W. Appelman
By Offield, Towle, Graves & Offield
Att'ys.

UNITED STATES PATENT OFFICE.

ERASTUS W. APPELMAN, OF CLERMONT, IOWA, ASSIGNOR, BY MESNE ASSIGNMENTS, TO AMERICAN DRAINAGE COMPANY, OF DUBUQUE, IOWA, A CORPORATION OF IOWA.

LAND-DRAIN.

13,595. Specification of Reissued Letters Patent. Reissued July 15, 1913.

Original No. 1,015,530, dated January 23, 1912, Serial No. 602,125. Application for reissue filed May 17, 1913. Serial No. 768,391.

*To all whom it may concern:*

Be it known that I, ERASTUS W. APPELMAN, citizen of the United States, residing at Clermont, in the county of Fayette and State of Iowa, have invented certain new and useful Improvements in Land-Drains, of which the following is a specification.

My invention has relation to devices for draining land and the object is to provide means for preventing all clogging or freezing of the drain pipe and to collect the moisture from a wide range of soil.

A further object is to so anchor the device beneath the surface of the ground and when so set, there will be no danger of the soil packing around the drainer and thereby destroying its usefulness.

It consists in sinking a preferably porous drain into the ground until it reaches either water or porous earth, then supplying it with a cap which keeps soil away from the opening and permits only water, filtered through the soil, to enter the drain.

It further consists in forming and maintaining a space near the top of the drain which in practice has a tendency to produce a partial vacuum whereby the moisture is drawn from a large distance around and the soil is kept from packing so that it will always be free to filter to the best advantage.

The mode of construction and manner of operation will be fully set out in the following specification when read in connection with the drawings accompanying the same and forming a part hereof.

Figure 1:
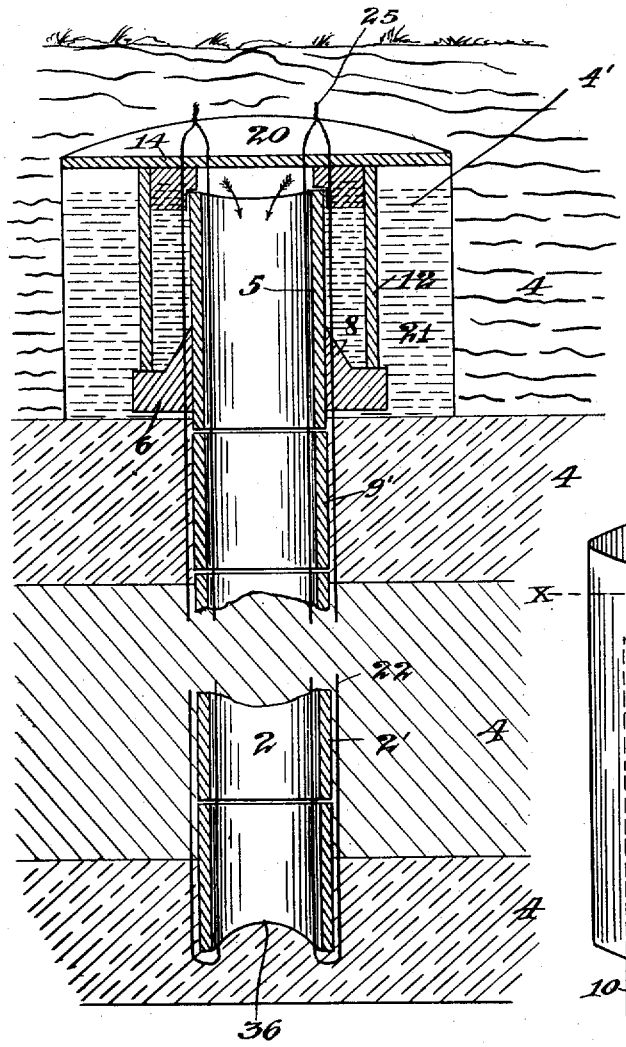
Figure 3:
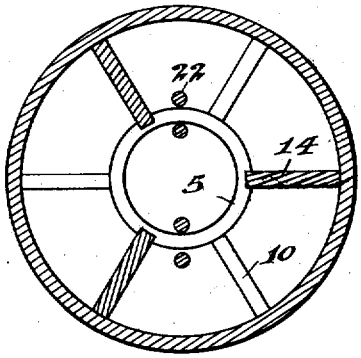
Figure 2:
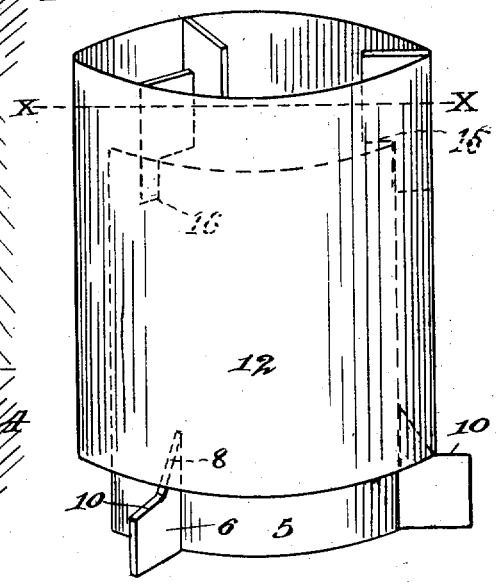

Figure 1 is a vertical section of the device in position for use. Fig. 2 is a perspective view of the cap with the cover removed. Fig. 3 is a cross section through line *x—x* of Fig. 2.

Like characters of reference denote corresponding parts in each of the figures.

Referring to the drawings, 2 designates a drain inserted in the ground 4. This drain is preferably made circular in form, of terra cotta, cement or some other porous material, and also preferably made in sections 2′ one set upon the other. It extends down through the harder material of the ground till it reaches water or porous earth. On the top of this drain is set a tile 5, to which is secured near its lower end, supports 6 preferably three in number which are of wedge shape at the top 8 and provided with a shoulder 10. These supports may also be made of the same material as the tile 5 and be cast or molded integral therewith. Upon these shoulders 10 of the supports 6 rests a circular soil fender 12 which extends above the top of the tube 5, about the same distance as the distance from the shoulders 10 to the base of the tile 5. Upon the top of the tile 5 are set a plurality of members 14 also provided with shoulders 15, and arms 16 that extend down along the outer side of the tile 5 and serve to keep the tile 5 and the soil fender 12 at the same distance apart entirely around the tile 5 and also these members further serve to support the cap subsequently to be described.

For the purpose of causing a tendency toward a vacuum around the soil fender 12 and also to prevent the packing of the soil around said fender there is provided a cover or circular cap 20 of convex form which extends out beyond the soil fender for considerable distance preferably as much beyond the soil fender as half of the diameter of said fender but it may extend less or more. This cover rests upon the top of the soil fender and the members 14. Through the cover there are four holes in which are inserted wires 22 that extend down within the fender and upon opposite sides of the tile 5 and drain 2, and are united together at the top by a twist 25 in the wire. This rigidly holds the cap upon the fender and members 14 and also holds the sections of the drain 2 together, making one continuous tile from the top of the tile 5 to the bottom of drain 2. It also serves to keep the lower section of the pipe 2 in position, as when a large amount of water has passed through the pipe 2 it may have washed out or disarranged the support of the pipe in the ground. As will be seen from the drawings, the space around the fender forms a chamber 4′.

The manner of assembling and using this device is as follows: A circular opening 21 of the size of the cover 20 is sunk in the ground to the depth of something more than the distance from the top of the cover to the top of the drain 2. In the center of this opening is bored another hole of the size of the drain 2, to such depth as will reach water or porous earth, then the sections of the drain 2 are threaded on wires 22 and sunk into the opening thus formed one after another until they come to the top of the opening at 30. The operator then threads upon the wires, the tile 5 and anchors said tube upon the top of the drain 2. Around this, upon the shoulders 10, is set the soil fender 12 and upon the tile 5, the members 14 with their arms 16 projecting down between the tile 5 and the fender 12. The wires are then passed through the holes in the cover 20 and are twisted until they rigidly unite the different sections of the pipe 2, the tile 5, the members 14 and the cover 20 firmly together. This leaves, as will be noticed, the space entirely around the fender 12 of the size of the cover. The earth is then placed upon the cover 20 and it is buried to the depth of one or more feet according as the necessities of the soil and surroundings demand, to keep it from freezing, and also from packing too tightly. When it is set, the moisture will percolate or filter into the space 21 until that is nearly filled and then the water will pass up between the tile 5 and the soil fender and between the members 14 and into the tile 5 and out at the base 36 of the drain 2 into the surrounding soil.

If the soil around the space 21 be of sand or other earth that will not sustain itself, then there may be placed against the wall another soil fender or other stay that will readily allow the water to pass through into the space 21. And it will be seen that by means of the extension of the cover beyond the fender 12 and this mode of uniting together and adjusting the various parts that there will be produced beneath that cover a substantial tendency toward a vacuum whereby it will, after it has once been filled, draw the moisture from a large distance around the device and all of the water that is carried in will be filtered water, and hence will not clog in any way the drain 2 or the tile 5, and if the space 21 should be partially filled with earth it would not pack but would remain loose and porous and give a good filter into the pipe 5. Further, on account of this tendency to produce a vacuum and the cover there would be no packing of the soil for some distance around the device so as to prevent the free filtering of the water.

All of the devices including the different sections of the drain 2, the tile 5, and the soil fender 12 are preferably of porous material and hence there would be more or less of the moisture from the soil that would enter through those into the drain 2 and this would draw the moisture from a large distance around the device. It will be seen by this modé of construction and use that there will be no freezing or clogging of the drain since the parts are set deep enough in the soil to prevent such freezing, and the draining will go on as well in the winter season as at any other time and the soil can be worked over the top of the device as early, if not earlier, in the spring than the soil that needs no draining.

It is manifest that the drain 2, the tile 5 and the soil fender 12 may be of rectangular shape or in fact any convenient shape, I have shown them round as being the most convenient for preparation and installing.

Having now described my invention, what I claim and desire to secure by Letters Patent is:—

1. In a device of the class described, a drain sunk in the ground, a soil fender around the upper end of the drain and means in connection with the soil fender for causing a tendency toward a vacuum around the soil fender.

2. In a device of the class described, a drain sunk in the ground, a soil fender around the upper end of the drain and extending above said drain, and a cover over the fender and above the drain, extending out from and beyond the upper edge around said fender.

3. In a device of the class described, a drain set in the ground, a tile upon the drain, a soil fender around the tile and means in connection with the soil fender for forming at times a partial vacuum around said fender.

4. In a device of the class described, a drain set in the ground, a tile upon the drain, a soil fender around the tile, and a cover over the tile and the top of the soil fender projecting beyond the upper edge around said fender.

5. In a device of the class described, a drain sunk in the ground, a soil fender around the upper end of the drain and extending above the drain, supports engaging the drain upon which the fender rests, and a cover over the drain and the soil fender extending beyond and around the upper edge of the fender and when sunk in the earth, adapted to form a partial vacuum beneath the cover around the fender.

6. In a device of the class described, a drain sunk in the ground, a soil fender around the upper portion of said drain and extending above the same, members inserted between the drain and fender, and a cap resting upon the members and projecting beyond and around the fender.

7. In a device of the class described, a drain sunk in the ground, supports attached to the drain, a soil fender around the upper portion of the drain and resting upon the supports, members inserted between the drain and soil fender, and a cover over the drain extending out from and around said fender.

8. In a device of the class described, a drain sunk in the ground, a soil fender surrounding the drain and extending above the top of the same, a cover over the drain and upon the top of the fender and projecting out from and around the fender, and means secured to the cover and the drain for holding the drain, the cover and the fender rigidly together.

9. In a device of the class described, a drain sunk in the ground, with a space in the ground around its upper portion, a soil fender around the drain within the space and extending above the drain, and a cover over said soil fender and covering the space around said fender and all inclosed within the ground.

10. In a device of the class described, a drain sunk in the ground with a space around the upper portion of the drain, a fender set around the drain within said space and extending above the drain, and a cover upon the fender and projecting over and covering the space around the fender.

11. In a device of the character described, a drain sunk in the ground, a soil fender above the drain, a cover above the soil fender, and means in connection with the cover and soil fender for forming at times a partial vacuum around the soil fender and beneath the cover.

12. In a device of the class described, the combination with a drain sunk in the ground formed of separate superimposed sections, with a space in the ground forming a chamber above the upper end of said drain, of a soil fender for the upper end of said drain and spaced away as to its main body portion from the walls of said chamber, and a closed cover member over the soil fender and drain projecting beyond the body of said soil fender and covering the upper end of said chamber, and all inclosed within the ground.

13. In a device of the character described, the combination with a drain sunk in the ground with a space around its upper end to form a chamber, of a soil fender in said chamber and having its main body portion spaced away from the side walls of the latter, and a closed cover member over the fender and drain and covering the upper end of said chamber, and all inclosed within the ground.

14. In a device of the character described, the combination with a drain sunk in the ground, with a space in the ground around its upper portion forming a chamber, of a soil fender in said chamber and having its main body portion spaced away from the side walls thereof, and a substantially closed cover member over the drain and fender covering the upper end of said chamber, and all inclosed within the ground.

15. In a device of the character described, the combination with a drain sunk in the ground with a space around the upper end of said drain forming a chamber, of a cover above the upper end of said drain projecting beyond the sides of the same and covering the upper end of the chamber, and all inclosed within the ground.

16. In a device of the character described, the combination with a drain sunk in the ground and forming a plurality of superimposed separate sections, of a soil fender within a space in the ground forming a chamber above the upper end of the drain, the main body of said soil fender being spaced away from the side walls of said chamber, and a substantially closed cover over the fender and projecting beyond the body of the same and covering the upper end of said chamber, and all inclosed within the ground.

17. In a device of the character described, the combination with an open-ended drain sunk in the ground with a space in the ground above its upper end forming a chamber, of a fender in said chamber, a substantially closed cover member above the upper end of the drain projecting beyond the sides of the latter and covering the upper end of said chamber, and all inclosed within the ground.

18. In a device of the character described, the combination with an open-ended drain sunk in the ground with a space in the ground forming a chamber around the upper end of the drain, of a substantially closed cover member above the drain projecting beyond the sides of the latter and covering the upper end of said chamber, and all inclosed within the ground.

ERASTUS W. APPELMAN.

Witnesses:
A. E. Wood,
W. P. Hogan.

Copies of this patent may be obtained for five cents each, by addressing the "Commissioner of Patents, Washington, D. C."